(12) United States Patent
Metke et al.

(10) Patent No.: US 6,315,668 B1
(45) Date of Patent: Nov. 13, 2001

(54) SYSTEM AND METHOD FOR NETWORKING VIDEO GAMES

(75) Inventors: Anthony R. Metke, Woodridge; Jeffrey L. Allen, Naperville, both of IL (US)

(73) Assignee: Midway Games, Inc., Chicago, IL (US)

( * ) Notice: Subject to any disclaimer, the term of this patent is extended or adjusted under 35 U.S.C. 154(b) by 0 days.

(21) Appl. No.: 09/290,431

(22) Filed: Apr. 13, 1999

Related U.S. Application Data

(60) Provisional application No. 60/101,923, filed on Sep. 24, 1998.

(51) Int. Cl.⁷ .................................................. G06F 17/00
(52) U.S. Cl. ................................................ 463/42; 463/40
(58) Field of Search .................................. 463/40, 41, 42

(56) References Cited

U.S. PATENT DOCUMENTS

| | | |
|---|---|---|
| Re. 35,314 | 8/1996 | Logg . |
| 3,654,392 | 4/1972 | Beinhocker et al. . |
| 4,193,121 | 3/1980 | Fedida et al. . |
| 4,208,715 | 6/1980 | Kumahara et al. . |
| 4,302,010 | 11/1981 | Kaenel . |
| 4,335,809 | 6/1982 | Wain . |
| 4,372,558 | 2/1983 | Shimamoto et al. . |
| 4,477,069 | 10/1984 | Crudgington, Jr. . |
| 4,521,014 | 6/1985 | Sitrick . |
| 4,564,923 | 1/1986 | Nakano . |
| 4,570,930 | 2/1986 | Matheson . |
| 4,572,509 | 2/1986 | Sitrick . |
| 5,083,271 | 1/1992 | Thacher et al. . |
| 5,292,125 | 3/1994 | Hochstein et al. . |
| 5,350,176 | 9/1994 | Hochstein et al. . |
| 5,354,202 | 10/1994 | Moncrief et al. . |
| 5,674,128 | 10/1997 | Holch et al. . |
| 5,685,775 * | 11/1997 | Bakoglu et al. ................. 463/41 |
| 5,702,305 | 12/1997 | Norman et al. . |
| 5,816,920 | 10/1998 | Hanai . |
| 5,841,980 * | 11/1998 | Waters et al. ................. 395/200.34 |
| 5,894,556 * | 4/1999 | Grimm et al. ................. 395/200.57 |
| 6,052,819 * | 4/2000 | Barker et al. .................... 714/776 |

OTHER PUBLICATIONS

LaMonthe, Andre. "Net–Play: A High–Energy Network Solution." Game Developer. Jun. 1994. pp. 33–38.*
Translation of German Language Patent Description of No. 2724153, Aug. 24, 1978.
"Computer Poker," Nicholas V. Findler.
"Multimachine Games," Ken Wasserman and Tim Stryker, BYTE Publications Inc., Dec. 1980.
"The Xerox Alto Computer," Thomas A. Wadlow, BYTE Publications Inc., Sep. 1981.
"Commbat: A Tele–Game for Two," George Stewart, BYTE Publications Inc., Dec. 1981.

* cited by examiner

*Primary Examiner*—Valencia Martin-Wallace
*Assistant Examiner*—Julie Kasick
(74) *Attorney, Agent, or Firm*—Jenkens & Gilchrist; Stephen G. Rudisill; Daniel J. Burnham

(57) ABSTRACT

A system for a networking electronic game units, includes an arcade router coupled with one or more game units at each of a plurality of locations and coupled to a communications resource for supporting bi-directional exchange of information with the one or more game units. A first router is coupled with a first group of the communications resources for supporting bi-directional exchange of information with a first group of game units. A first server is coupled with the first router for controlling the bi-directional exchange of information so as to support interactive play by game units at different locations. Embodiments of the system may include a state synchronizing method for synchronizing the exchange of information among game units which are engaged in interactive play in such a manner that each of the game units operates on substantially the same sequence of incoming information, and a bandwidth manager for controlling access of each game unit to the network based on available bandwidth and on a player skill level associated with each game unit.

41 Claims, 9 Drawing Sheets

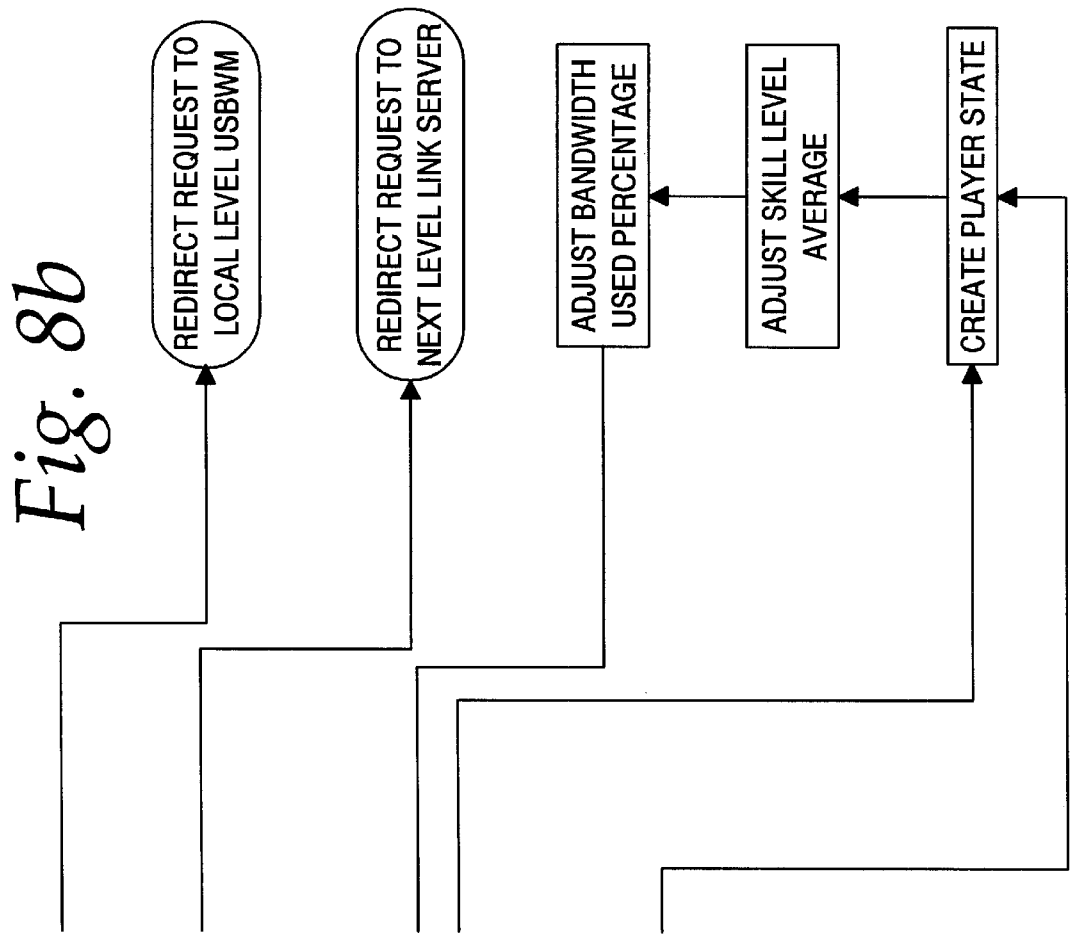

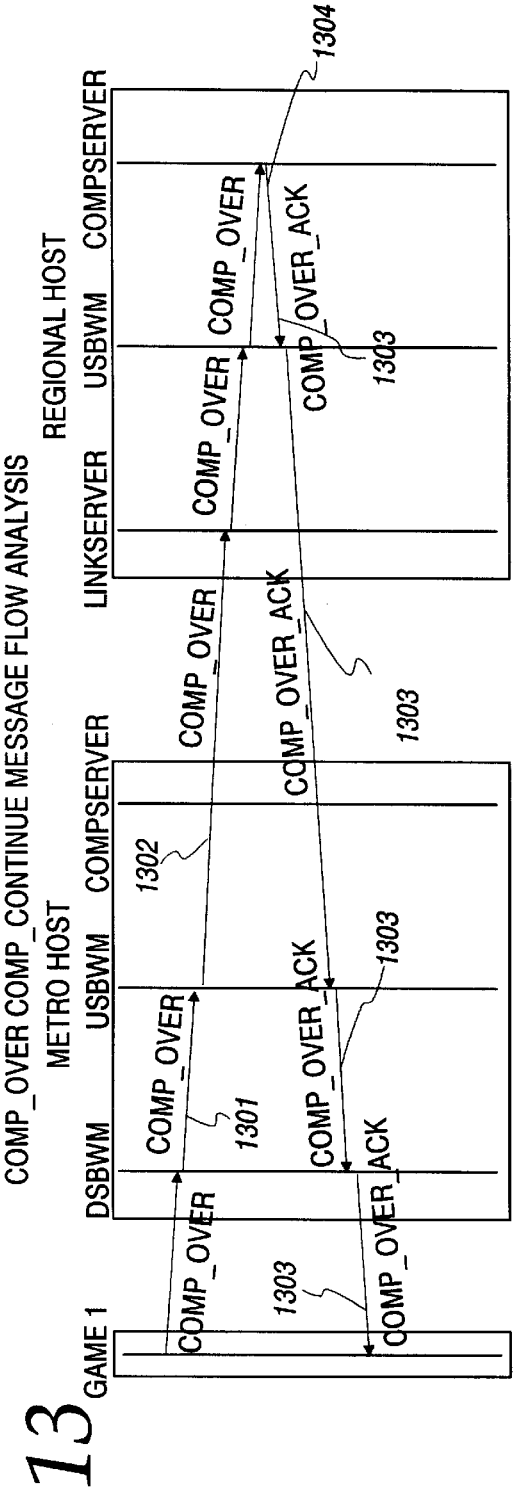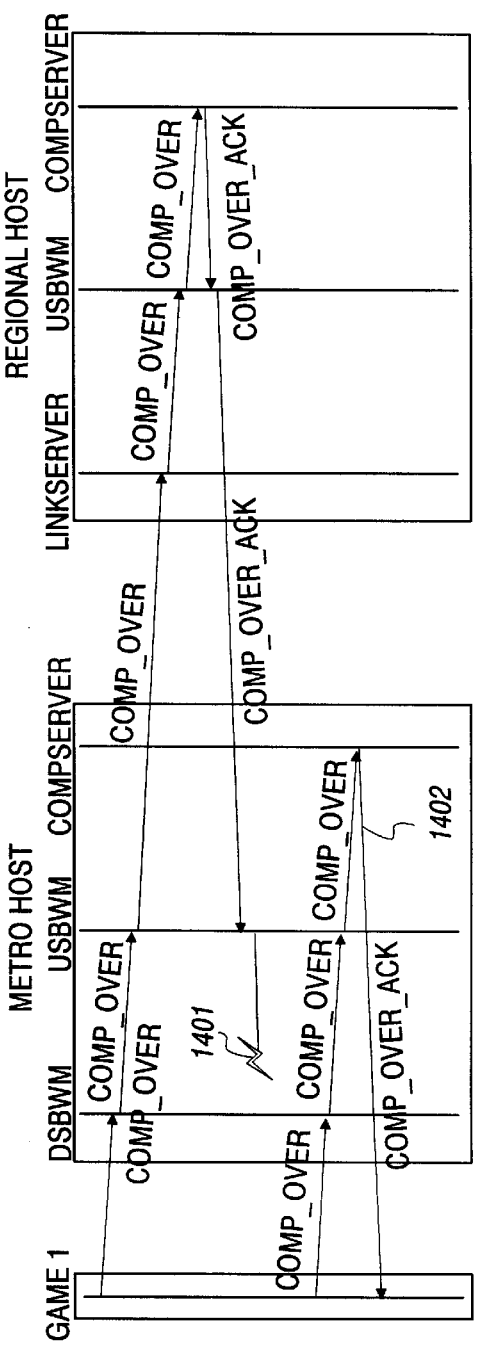
Fig. 13
Fig. 14

SYSTEM AND METHOD FOR NETWORKING VIDEO GAMES

CROSS REFERENCED TO RELATED APPLICATIONS

This application claims the benefit of pending provisional patent application Ser. No. 60/101,923, filed Sep. 24, 1998.

FIELD OF THE INVENTION

A method and system are described for networking several video games together to form a multi-system game for interactive play. The invention includes a synchronization method, referred to herein as the "State Sync. Method." The invention also includes a bandwidth management method and system for such a network.

BACKGROUND OF THE INVENTION

Definition of Terms

The following terms, as used herein, have the following meanings:

Game Unit, or Video Game Unit—Any piece of computing equipment that executes software used for entertainment purposes, including but not limited to, video game equipment or a general purpose computer running video game software.

Game—The experience of playing on a video game. A game may be a played on a single stand-alone game unit or on more than one game unit.

Multi-System Game—A game played on more than one video game unit.

State Sync. Method—A means of allowing players at multiple game units to participate in a multi-player, multi-system game. This method is further defined below.

Game State, or State—Game state refers to the value, at a given instant in time, of those parameters that control the outcome of the game. Some examples of game state parameters are, the position of objects both on and off the screen, character strength, character health, and wealth.

Value of a State—For a given state, state_n the value of state_n defines all game parameters that effect the outcome of the game.

State Transitions—State transitions occur periodically. The new game state will be a function of the current game state and the current inputs.

State Synchronization—During game play the game state is periodically changing. The state changes typically occur 30 to 60 times per second. Multiple game units are said to have their states synchronized if the sequence of game states that occurs on each game unit are identical. It is not necessary for the state transitions to occur at the same time, nor is it necessary that all game units remain in any given state for the same amount of time.

Group—The term group will be used to refer to the subset of game units which are networked together and need to maintain state synchronization. The game units in a group are said to be participating in a multi-system game.

System—Any piece of computer equipment. This term is sometimes used herein synonymously with game unit.

Inputs—This term refers to any event caused by influences external to the game or group that may affect state transitions, or that may affect the outcome of the game. This includes but is not limited to the pressing of buttons, or the moving of a joystick or actuation of other input devices.

Two or more physically independent game units connected via any data communications network, or any direct electrical connection, require some sort of network management system or method if players at different geographical locations are to participate in the same game. The present invention provides such a system or method.

In general, a video game program is based on a series of state transitions. Typically these transitions are made at periodic intervals usually related to the video frame rate for that game system. Some or all of the state transitions will be dependent on input values. Multiple game units coupled via a network for a multi-system game require some method of state synchronization. The invention provides such a method.

SUMMARY OF THE INVENTION

In accordance with one aspect of the invention, there is provided a method and system for networking video games which permits two or more players in different locations to engage in real time interactive play.

In accordance with another aspect of the invention, there is provided a synchronization method which synchronizes two or more game units at different locations which are linked by a network such that the same sequence of game states occurs on each game unit.

In accordance with yet another aspect of the invention, there is provided a bandwidth management system and method which monitors available network bandwidth in order to coordinate competition and control player access to a hierarchy of network levels based on predetermined player criteria.

The State Sync. Method of the invention assures that each game unit maintains state synchronization with every other game unit in a group of networked video game units. This is accomplished by ensuring that each game unit in the group operates on the same stream of input that every other game unit in the group operates on. The bandwidth management method and system of the invention implements a scheme of regulating user access to available network bandwidth in a manner consistent with network capacity and user expectations.

In accordance with another aspect of the invention, a system for networking electronic game units, comprises an arcade router coupled with one or more game units at each of a plurality of locations and coupled to a corresponding communications resource for supporting bi-directional exchange of information with said one or more game units, a first router coupled with a first group of said communications resources for supporting bi-directional exchange of information with said one or more game units at said plurality of locations, and a first server coupled with said first router for controlling said bi-directional exchange of information so as to support interactive play by a plurality of game units at different ones of said plurality of locations.

In accordance with another aspect of the invention, there is provided a state synchronizing system for synchronizing the exchange of information among a plurality of game units linked together for interactive play in such a manner that each of said game units operates on substantially the same sequence of incoming information.

In accordance with yet another aspect of the invention, there is provided a bandwidth manager for a plurality of game units capable of being linked to a network for interactive play, the bandwidth manager including means for determining available bandwidth on each communications resource of the network, means for determining a player skill level associated with each game unit requesting access to the network, means for determining the average skill level of all players requesting access to the network, means for establishing a promotion threshold based on the average skill level and the available bandwidth and means for granting player access to the network if the player's skill level exceeds the promotion threshold.

In accordance with yet another aspect of the invention, there is provided a state synchronizing method for synchronizing the exchange of information among a plurality of game units linked together for interactive play in such a manner that each of said game units operates on substantially the same sequence of incoming information. This state synchronizing method includes means for determining the number of game units participating in a multi-system game, means for determining the input data of each of said game units when in a first state, and means for preventing each of said game units from transitioning to a next state until data inputs from every other game unit in said multi-system game in said first state have been transmitted to each other game in said multi-system game, such that all game units in said multi-system game operate on the same set of said input in each state prior to transitioning to the next state.

BRIEF DESCRIPTION OF THE DRAWINGS

In the drawings:

FIGS. 12, 13 and 14 are flow diagrams illustrating further aspects of bandwidth management in accordance with the invention.

DETAILED DESCRIPTION

I. System Overview

Figure 1:
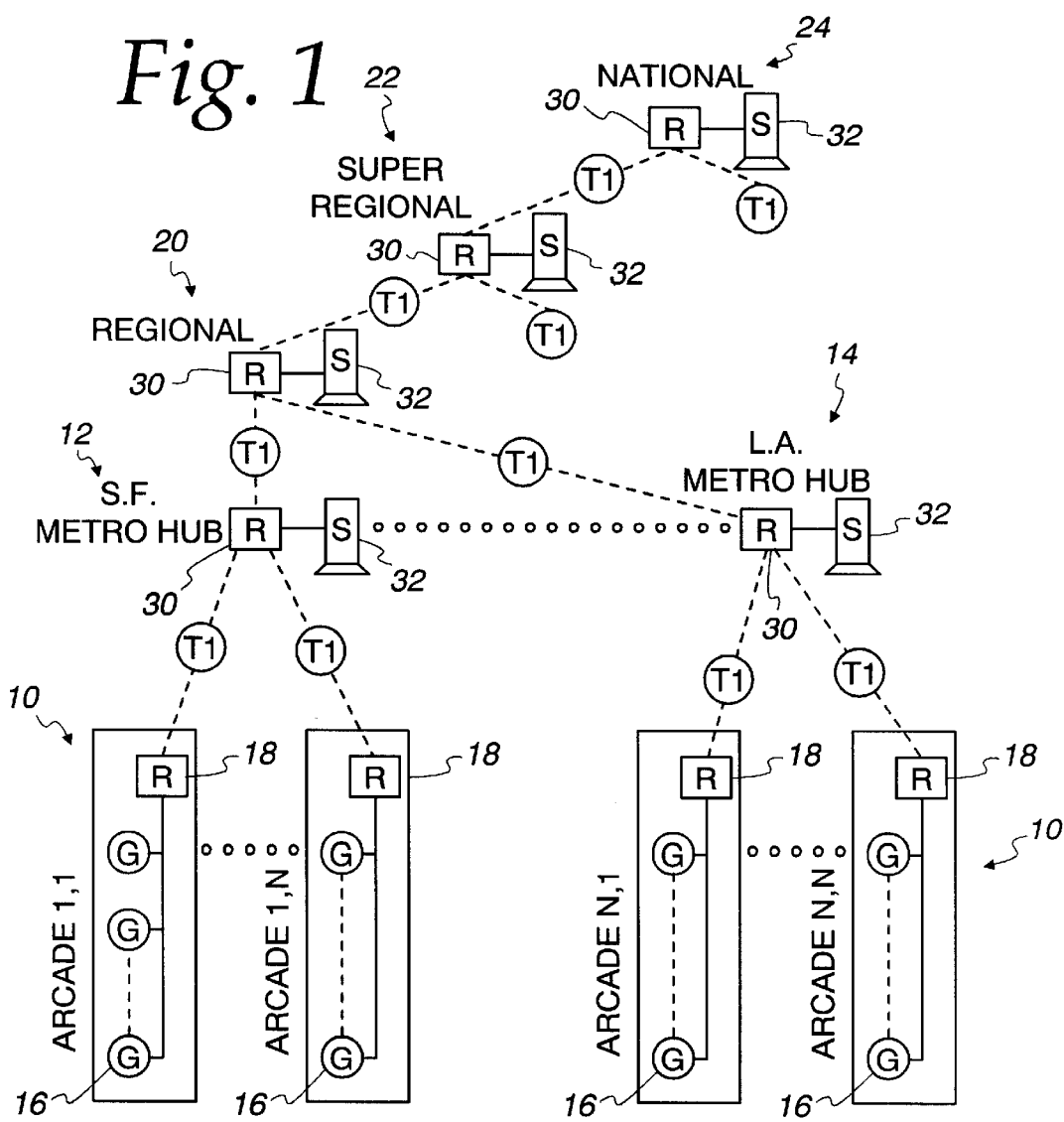
FIG. 1 shows a system for networking video games in accordance with the invention.
Figure 2:
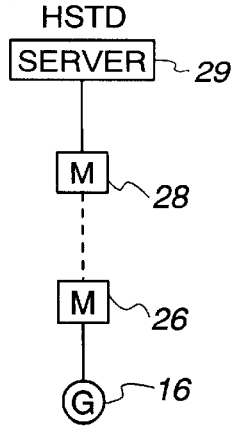
FIG. 2 is a simplified diagram illustrating the operation of a prior art high score to date type of tournament system.
Figure 3:
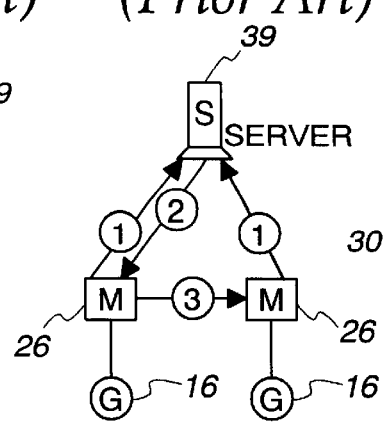
FIG. 3 is a simplified block diagram of the operation of a prior art system for interactive play between only two players in different locations.

Referring to FIGS. 1 through 3 and initially to FIG. 1, there is shown an example of a video game network in accordance with the invention. One example of a network of the type shown in FIG. 1 is referred to hereinbelow as WaveNet. FIGS. 2 and 3 illustrate two "prior art" systems for linking video game units in different locations.

Referring to FIG. 1, in the present invention, two or more game units 16 at different locations may be linked for real time interactive play. These game units may include one or more game units from each of a plurality of groups of arcades 10, here designated as arcade 1, 1 through arcade 1, n and arcade n, 1 through arcade n, n. The arcades of arcade group 1 are linked, through respective T-1 lines to a first or metro hub 12 here designated as the San Francisco (SF) hub. Similarly, the arcades 10 of group n are linked by T-1 lines to another first or metro hub, here designated as the Los Angeles (LA) hub. Each arcade includes a plurality of the game units 16 which are operatively coupled with an arcade router (R) 18. Additional groups of arcades coupled to additional metro hubs may be added without departing from the invention.

A number of the metro hubs 12, 14, etc. may be coupled by T-1 communication lines to a regional center 20. Similarly, one or more of such regional centers 20 may be coupled by T-1 lines to a super-regional center 22 and one or more super-regional centers 22 may be coupled by T-1 lines to a national center 24. Communications resouces other than T-1 lines could be used without departing from the invention, such as fiber optic or other high bandwidth resources, preferably at T-1 or higher capacities.

Each metro hub 12 and each of the centers 20, 22, 24 is similar in that it includes a router (R) 30 and a server (S) 32. The servers 32 implement bandwidth management as described later herein in further detail. Generally speaking, each of the servers 32 at the metro hubs 12, 14 monitors the bandwidth usage on the T-1 lines between the metro hub 12, 14 and the various arcades 10 which are linked to that hub via these T-1 lines. This is referred to herein as downstream bandwidth management. In upstream bandwidth management, the servers 32 monitor the bandwidth usage on the T-1 line between the associated router and the next higher level as shown in FIG. 1, and control access to the respective T-1 lines. This is known as upstream bandwidth management.

Advantageously, the arrangement of routers and servers as illustrated in FIG. 1 is such that a player at an individual game unit 16 in any arcade may engage in real time interactive play with other players at other game units in other locations, whether in the same arcade or in a different arcade. These players may be in different arcades served by the same metro hub, or may be in locations which are ultimately linked by a regional, super-regional or a national center through the intervening centers and hubs. Advantageously, the bandwidth management and state synchronization aspects of the invention make possible real time interactive play which is perceived by individual players as being substantially simultaneous play. This is done in such a manner that, regardless of the locations of the several players, the perception of each player is essentially as if the other players were located immediately adjacent to one another in the same location or arcade.

While the invention is described herein with reference to video game units in an arcade, it will be understood that the invention is applicable to game units of other types as well. For example, the network of the invention may be utilized to link home video games, whether played on stand-alone units through game controllers that link to ordinary TV sets or for games that are played on personal computers (PCs). Any of these game units, if provided with suitable hardware and software for accommodating networking operation, could be linked to the network described above with reference to FIG. 1.

Referring briefly to FIG. 2, there is shown one type of prior art tournament system, referred to as a high score to date system, in which players do not compete interactively with each other. One system of this type is shown in U.S. Pat. No. 5,083,271 to Thacher et al., wherein all players competing in a tournament play their games individually and when finished transmit their scores to a central server. Thus, in this system, each individual game unit 16 is linked via a modem 26 to a cooperating modem 28 of a central server 29. This central server 29 then receives individual scores, one at a time from a number of game units 16 which are sequentially interconnected with its modem 28, for example by polling of the various game unit modems 26 by the server 29 in some preselected sequence. While a given game unit 16 is being polled by the server 29, information may be exchanged between the server and the game unit to indicate to the player scores of other players participating in the tournament who have completed games to date, such that the individual player may compare his score with other scores of games completed to date. Hence, the name usually given to such a system, "high score to date."

FIG. 3 shows yet another prior art system in which a server 39 facilitates interconnection for interactive play between only two game units 16, each of which has a modem 26. The server 39 may also include a modem (not shown) for communicating with the individual game unit modems 26. The process is a three step process as indicated by arrows 1, 2 and 3 in FIG. 3. In the first step, the two modems 26 from the two game units 16 address the server either simultaneously or sequentially and indicate their availability for linked play. In the second step, the server indicates to the first player making such a request the availability of the second player and transmits the telephone number or the email address of the second player. If interested in engaging the second player, the first player, as indicated in step 3, contacts the second player by using this telephone or email address, and play commences directly between the two players. The server 39 is not involved during the actual play between the two players, but only facilitates the task of initially locating another player.

The systems shown in FIGS. 2 and 3 have a number of limitations. For example, the system of FIG. 3 cannot be used to link more than two players for interactive play, and cannot be utilized to facilitate tournament play as with the system of FIG. 2. On the other hand, the high score to date tournament system of FIG. 2 is not capable of supporting real time interactive play among the various players, but can only compare scores and transmit the resulting scoring information to the individual players.

II. State Synchronization

When using the state sync. method of the invention, each system of the group must agree on the value of each game state as the game unit sequences from the initial state to the final state at the end of the game. Let the first state that a game unit is in when a multi-system game begins, be designated state__1. A game unit will act on various inputs (for example a user's button depressions and joystick movements) during state__1 and it will go into a new state, state__2. The value of an arbitrary state will be called state__n where n indicates when the state occurred in the sequence of states making up the game. The value of state__n, will be a function of value of the previous state (state__n−1) and the value of the inputs as sampled prior to state__n.

The invention includes a method of ensuring that while in any given state, each system of a group will allow certain state transitions to occur only when the system is operating on the same set of input that every other system in the group will operate on when in that given state.

To achieve this, each game unit in the group must transmit all necessary input data to all game units in the group, and insure that state transitions at each game are based on identical input data.

For example, suppose system 1 samples the following input $I(1,1)$, $I(1,2)$, $I(1,3)$, $I(1,4)$, $I(1,5)$, where $I(n,m)$ is the mth sample of input obtained by the nth system, and system 2 samples $I(2,1)$, $I(2,2)$, $I(2,3)$, $I(2,4)$, and $I(2,5)$. One aspect of the invention concerns a method to insure that when any system in the group of x systems operates on inputs $I(1,1)$ it will also operate on input $I(2,1)$, $i(3,1)$, . . . $I(x,1)$ for all systems in the group, and that, each system of the group will operate on all inputs $I(1,n)$, $I(2,n)$, . . . $I(x,n)$ while in state__n.

In accordance with this aspect of the invention, in the event that a game unit has not received all input required for a given state, the game unit must defer from making a state transition until all necessary data has been received from each game unit in the group.

The operation of one aspect of the invention is described in connection with the following examples which describe a four player group (i.e. a four player game) with four physical game units participating. The invention is applicable to more or fewer (than four) game units, the following being but one set of examples.

Example 1 depicts a buffer that holds 4 sets of inputs for 4 computer systems. This buffer would be used on each of the four game units. We will be looking at the buffer of game unit 1 in this example.

EXAMPLE 1

|  | $4^{th}$ Inputs | $3^{rd}$ Inputs | $2^{nd}$ Inputs | $1^{st}$ Inputs |
| --- | --- | --- | --- | --- |
| System 1 |  |  |  |  |
| System 2 |  |  |  |  |
| System 3 |  |  |  |  |
| System 4 |  |  |  |  |

The column labeled "$1^{st}$ Inputs" represents all inputs detected during the first time interval during which user inputs are sampled. In this context "inputs" refers to any activation of game unit elements, such as pushbuttons, joysticks, or the like by a player, or other signals generated by the game unit in response to some action taken or initiated by a player. "$N^{th}$ Inputs" represent all inputs detected during the $N^{th}$ time interval during which user inputs are sampled. As inputs are sampled at the local system (i.e., game unit 1), they are stored in the buffer, and they are also transmitted to each other system (game unit) in the group. The state transaction functionality of the game unit requires inputs from each system and will not act on the inputs until there is a set of inputs available from each system in the group.

The following examples depict the usage of this buffering technique to keep four separate systems (game units) in state synchronization.

System 1 will obtain its first user inputs and store them into the buffer cell (System 1, $1^{st}$ Inputs) i.e. $I(1,1)$, as shown in Example 2. It will also transmit these inputs to each system in the group.

EXAMPLE 2

|  | $4^{th}$ Inputs | $3^{rd}$ Inputs | $2^{nd}$ Inputs | $1^{st}$ Inputs |
| --- | --- | --- | --- | --- |
| System 1 |  |  |  | $I(1,1)$ |
| System 2 |  |  |  |  |
| System 3 |  |  |  |  |
| System 4 |  |  |  |  |

When System 1 obtains its second set of user inputs it will store them in cell (System 1, $2^{nd}$ Inputs). It will also transfer these new inputs to each system in the group as shown in Example 3.

EXAMPLE 3

|          | 4th Inputs | 3rd Inputs | 2nd Inputs | 1st Inputs |
|----------|------------|------------|------------|------------|
| System 1 |            |            | I(1,2)     | I(1,1)     |
| System 2 |            |            |            |            |
| System 3 |            |            |            |            |
| System 4 |            |            |            |            |

When System 1 starts receiving the user inputs from other systems in the group it will store them in the appropriate cells of the buffer. For example when System 1 receives System 3's $1^{st}$ inputs the buffer will be as represented by Example 4.

EXAMPLE 4

|          | 4th Inputs | 3rd Inputs | 2nd Inputs | 1st Inputs |
|----------|------------|------------|------------|------------|
| System 1 |            |            | I(1,2)     | I(1,1)     |
| System 2 |            |            |            |            |
| System 3 |            |            |            | I(3,1)     |
| System 4 |            |            |            |            |

After System 1 has sampled its $3^{rd}$ set of inputs and subsequently received its first set of inputs from System 2, and the second set of inputs from System 3 the buffer will be as represented by Example 5.

EXAMPLE 5

|          | 4th Inputs | 3rd Inputs | 2nd Inputs | 1st Inputs |
|----------|------------|------------|------------|------------|
| System 1 |            | I(1,3)     | I(1,2)     | I(1,1)     |
| System 2 |            |            |            | I(2,1)     |
| System 3 |            |            | I(3,2)     | I(3,1)     |
| System 4 |            |            |            |            |

Up to this point none of the inputs have been operated on in any way that will affect the state of any portion of the program with the exception of the state of the buffer itself. Once the last set of user inputs arrive the program can operate on all the inputs I(x,1). The buffer will temporarily be as shown in Example 6.

EXAMPLE 6

|          | 4th Inputs | 3rd Inputs | 2nd Inputs | 1st Inputs |
|----------|------------|------------|------------|------------|
| System 1 |            | I(1,3)     | I(1,2)     | I(1,1)     |
| System 2 |            |            |            | I(2,1)     |
| System 3 |            |            | I(3,2)     | I(3,1)     |
| System 4 |            |            |            | I(4,1)     |

System 1 may now act upon the first set of inputs ($1^{st}$ Inputs) together. These inputs are then discarded from the buffer and the $2^{nd}$ set of inputs are now next to be operated on. Similarly, each other system (game unit) in the group will act upon the $1^{st}$ set of inputs once it has received all first inputs from all systems in the group.

After System 1 operates on the first inputs the buffer will be as shown in Example 7.

EXAMPLE 7

|          | 5th Inputs | 4th Inputs | 3rd Inputs | 2nd Inputs |
|----------|------------|------------|------------|------------|
| System 1 |            |            | I(1,3)     | I(1,2)     |
| System 2 |            |            |            |            |
| System 3 |            |            |            | I(3,2)     |
| System 4 |            |            |            |            |

System 1 will not continue operating on user input until it receives all the second input data from all systems.

Use of this method will insure that each state transition occurring in each system will use the same set of input to transition from the old state to the new state. This ensures that the value of the new state, after the transition, will be identical on each machine.

Note that it is not necessary that each system operate on the input data at the same time, only that each system operate on the same sequence of input data.

Summarizing the above, let us call the initial state of any game software state_1, where state_1 is the state of the game unit just before the game unit operates on any user input. Further, if we call the state that a game unit is in after is operates on input i(x,1) state_2, then to stay in synchronization all we have to do is:

1. When in state n every game unit in the group must receive input I(x,n) from all game units i.e. for all values of x.
2. Each game unit must operate on the fill set of inputs I(x,n) before going to state_n+1.

Briefly, in operation, the state sync method described above means that each player linked by the system in a multi-player game or multi-system game as defined above will be aware of any action taken (or no action taken if such is the case) by each and every other player, at each state of the game. In the exemplary embodiment, the game states transition at a 60 hertz rate, that is 60 times per second which is also the typical frame rate of the video game units linked in such a system. Thus, for example, if one or more players is "slower" and takes no action through a number of states, this lack of action comprises the "input" which is delivered to all of the other game units linked by the system in a particular multi-system game. If, on the other hand, the input (that is, the activities or actions) of one player are delayed due to some delay in the network, on the transmission lines connecting various parts of the network a Subsidiary of Nortel Networks Company, or the like, the lack of an input from one or more players corresponding to a given state will cause the other games to also delay transition to the next state until all of the inputs have been received.

This is in contrast, for example, to a single or standalone game unit wherein the controller looks at all of the player input and determines the next state. Here, the next state cannot be fully determined until the input from all of the players in the multi-system game have been received. In the embodiment illustrated, the software for carrying out the state sync method is resident in the CPU or other central control unit of each individual game unit. That is, each game unit to be linked by the network of the invention is equipped with appropriate networking hardware and software both for linking through the routers 18 to the network and for carrying out the state sync method as described above.

III. Bandwidth Management

Introduction

Figure 4:
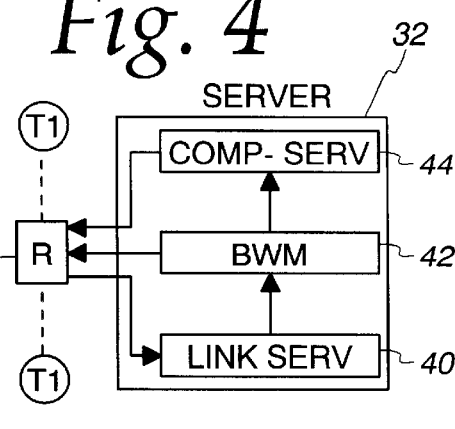
FIG. 4 is a simplified diagrammatic illustration of a logical server configuration of the invention.

The routers 30 may be commercially available routers, for example of the type available from Cisco Systems, Inc. or Bay Networks Inc. The servers may be PCs or PC-like computer components commercially available and designated as servers from various manufacturers such as Hewlett Packard, Compaq, and the like. These hardware servers also run software which is also frequently referred to as "server" or "logical server" software. This logical server software, in the illustrated embodiment, includes at least three basic elements as diagrammatically illustrated in FIG. 4.

A first of these elements is referred to as a link server 40 (sometimes referred to as Linkserv or some similar term hereinbelow). A link server 40 handles all messages received via the routers on the T-1 lines which are from the game units and forwards these messages when necessary to the bandwidth manager (BWM) 42 which is another element of the software or logical server. The BWM 42 decides whether to send game unit messages to its own competition server 44 (defined below) or to an "upstream link server," that is, to the logical link server 40 at the next higher level or center, such as regional, super-regional or national, where that link server 40 will begin the process again.

The bandwidth manager (BWM) 42 is a logical server which executes a heuristic for determining player access or "promotion" to each hierarchical level in the network system shown in FIG. 1. Thus, a request for play from a game 16 in arcade 10 will first be handled by a router 30 at its corresponding metro hub 12, 14, etc. and the corresponding link server 40 of the metro hub server 32 will relay the appropriate information to the associated bandwidth manager 42 to decide whether the request should be handled at the metro hub competition server 44 or forwarded to the link server 40 at the regional level 20 for a repetition of this process.

The competition server or CompServer (CompServe) 44 in essence "matches up" requests coming from various game units to determine which of these requests are suitable to link for interactive play. Various criteria may be used, such as game type, such that only games of the like or compatible types may be linked for interactive play. For example, to be linked, two or more players must be requesting play in the same "world", such as the same race track in a racing game. In the illustrative embodiment, the CompServer 44 may also look at the skill level of the players to more closely match skill levels of players within the overall or broader range of skill levels of the players which caused assignment to that hierarchical level of the network, as described more fully hereinbelow. The competition server 44 also considers the world of the request, that is, for example in a road racing game, only all players requesting racing on the same track can be linked for interactive play. Players desiring play in different "worlds," such as on different racetracks must wait until additional players requesting play in the same "world" also have their requests received at the same competition server. In addition, in the illustrated embodiment, the comp server 44 may send announcements to individual games when there are "unmatched" requests from other players waiting to compete, thus inviting others to join in in the multi-game competition up to the number of players which the system has a capacity for linking in interactive play in a multi-system game.

Reference to a "server suite" herein refers to the sets of logical servers (as described above) included within a particular hardware server 32. References herein to parent or "child" servers designate the location on the network hierarchy of FIG. 1, with a parent being at a higher level relative to a child. Reference to a "local" logical server means the logical server which is located within the same server suite.

The Bandwidth Manager (BWM) is a feature of the network described above with reference to FIG. 1, and is implemented by the servers 32, to support multi-player, multi-game unit, and multi-level competitions.

The primary job of the BWM is the monitoring of the available network bandwidth in order to coordinate and track multi-level competition services. A player will be granted access to the next level in the WaveNet hierarchy by BWM if there is sufficient inbound and outbound bandwidth and if the player has an appropriate skill level.

There are two tasks for BWMs. First, there's the upstream variety (USBWM) that is responsible for monitoring bandwidth on the connection between one level of servers and the next higher level in the hierarchy. There is one BWM of this type located at each level. If all "promotion" criteria are met, a "competition request" (and hence, the player) is forwarded ("promoted") to the parent server suite at the next level in the hierarchy, where the "promotion" process begins anew. If the "promotion" criteria are not met at any level, the message is retained at that level Server for final coordination.

The other type of BWM is the downstream variety (DSBWM), found only at the metro level. This BWM is responsible for monitoring bandwidth between the metro level server suite and the arcades. To do this accurately there is a separate BWM assigned to each arcade. The DSBWM then becomes the initial link between the arcade and the other servers. All game unit-to-server messages therefore pass through a DSBWM. Non-competition service messages are routed to the metro level LinkServer untouched. Competition service messages are handled separately. The same heuristics used in the USBWM determine whether or not a player is granted access to the network WaveNet. If access is granted, the messages are routed to the USBWM for further processing. If not, the message is dropped, that is if it is determined that there is not presently sufficient bandwidth available to support network play for any more players. The game will continue to transmit requests at a rate of one per second until it either times out or such bandwidth becomes available.

In reality there is but a single type of BWM. The DSBWM can be thought of as logically residing at the arcade even though it is located at the metro hub. Under this paradigm it too becomes an USBWM where it manages the connection from the arcade to the metro server suite. Bandwidth usage and access rights (promotions) are handled identically. The differences relate to the number of BWMs and to how the messages are handled and routed. In the following discussion, reference to BWM services will mean those that are common to both varieties. Where necessary, differences will be noted.

Design Nomenclature

The BWM is a network WaveNet logical server. The logical servers provide the network WaveNet services. The games shall be considered the clients. The clients are always the controlling agents in this paradigm and are responsible for initiating service requests. However, servers may send unsolicited notifications that may trigger requests from the client. The hardware where the servers are executing is termed the host.

The BWM runs in the background, closes all open file descriptors, resets the file creation mask, disassociates from its parent process group, and disassociates from the controlling terminal.

Message and data flow view is BWM centric; discussion regarding messages should be viewed with respect to the BWM (e.g., inbound is in to the BWM). When describing the server message flow, the communication endpoints will be indicated as being either the game unit or the server.

There may be multiple levels of service between the endpoints (i.e. flow through the NSS and LinkServer), but for the sake of brevity and clarity the levels may be ignored.

| Bandwidth Manager Acronyms | |
| --- | --- |
| ASL | Average Skill Level |
| CS | Competition Server |
| CSMM | Common Server Management Messages |
| DSBWM | Downstream Bandwidth Manager |
| FAP/FPT | Free Access Percentage/Free Promotion Threshold |
| ORP | Overhead Reserved Percentage |
| NSS | Network Subsystem |
| SPT | Skilled Player Threshold |
| SRP | Skilled Player Reserved Percentage |
| USBWM | Upstream Bandwidth Manager |

Network Bandwidth Management Concepts

The BWM is responsible for tracking the current in-use inbound and outbound upstream bandwidth on the network connection to the parent server suite (USBWM) or to the arcade (DSBWM). Recall that DSBWM's logically reside at the arcade. Both the server suite and the game unit-to-game unit traffic use this network connection.

When the BWM receives a Competition Request it first checks the current upstream bandwidth usage percentage. If bandwidth is available and the player has access rights (see section below "Player Access Rights and Promotion Heuristic"), the BWM begins the process of reserving and acquiring bandwidth for the player.

USBWM—If no bandwidth is available for the player (bandwidth is either maxed out or the player has an insufficient skill level), the USBWM routes the message to the local Competition Server.

DSBWM—If no bandwidth is available for the player, the DSBWM simply drops the message. There is nothing else that can be done if there is not enough bandwidth available to support a competition. The game unit will continue to transmit the competition request at a rate of one per second until it either times out or bandwidth becomes available.

For the remainder of this section, it is assumed that sufficient bandwidth to support a competition exists at the time of the request. The BWM then needs two external pieces of information to do its job; the game type in order to determine the game unit's bandwidth requirements and the maximum number of players allowed in a competition. The game unit's bandwidth requirement (GBR) is the maximum amount of bandwidth the game unit will ever need to acquire. It is assumed that the bandwidth required by the game unit is symmetrical with respect to inbound and outbound traffic. At the time the BWM receives a competition request, it has no a prior knowledge regarding the number of players that will be participating in the competition. Therefore, it must assume that the competition will be completely filled and reserve the maximum amount of bandwidth. If, for example, a game has a competition limit of 8 players, the BWM reserves 1 outbound GBR for each player and 7 corresponding inbound GBRs for the other 7 players. State for the player is created, the bandwidth is reserved, the in-use percentages are recomputed, and the player's request is routed to the appropriate server suite. Subsequent competition requests from the game unit do not perform bandwidth reservation.

The BWM must also readjust the usage after a competition has been formed, coordinated, and closed. Once closed, the competition has a fixed number of players. Since the worst case was assumed (i.e., maximum possible number of players) more bandwidth than was actually needed may have been reserved at the time of the initial competition request. The infrastructure for managing bandwidth adjustment is a callback chain of BWM_ADJUST messages. Just after broadcasting the COMP_CLOSED, the selected Competition Server sends a BWM_ADJUST message back toward each game unit through all BWM's responsible for promoting the player. Encapsulated in the message are the IP (internet protocol—or other protocol if applicable) addresses of all the game units involved in the competition. One inbound GBR is reclaimed for each game unit (player) that the BWM previously promoted (i.e. the BWM has state for the player). This is necessary because of the initial assumption of inbound traffic from the maximum number of competitors—players at lower skill levels (see "Player Access Rights and Promotion Heuristic") will not be generating inbound traffic on the upstream line. State regarding the competition is created in the BWM to ensure that the system only reclaims once per competition. After reclamation the usage percentages are adjusted and, if there is a child BWM, the BWM_ADJUST message is relayed back downstream. A BWM_ADJUST message is sent for each player in the competition. In the rare case that a BWM_ADJUST message is lost, it is not catastrophic. All that occurs is the bandwidth usage is not adjusted downwardly and remains falsely high or overused. This "overuse" is on the conservative side so the system is safe, i.e., within its limits. The COMP_OVER_ACK callback sequence or "garbage collection" will take care of this anomaly should it occur.

Once a competition has finished, the game units send either a COMP_OVER or a COMP_CONTINUE. The BWM and CompServer use this message (i.e., the ACK from the message) to clean up any state associated with the player and the competition. The BWM, as part of his cleanup, must reclaim all bandwidth (both in and outbound) allotted to the competition. Each game in the competition will be sending one of these messages. If more than one player in the competition was promoted by the same BWM, then the BWM will be receiving multiple requests for reclamation. Total reclamation for the competition is done upon receipt of the first COMP_OVER_ACK or COMP_CONTINUE_ACK. Subsequent messages are simply relayed back downstream.

The GBR value is a per-game-type tunable located in each game's section in a server suite configuration file. The tunable is called bandwidth_consumed and has units of kbits/second, for example, in the above example of an 8 player game:

bandwidth_consumed=128

Player Access Rights and Promotion Heuristic

The BWM is responsible for determining if a player is "good enough" to be granted access to a higher level competition. Access rights are based on the player's skill level as it relates to the current average skill level and current bandwidth usage. The player's skill level is determined by the game unit and encapsulated in the competition request message. The current bandwidth usage is the greater of either the inbound or outbound upstream bandwidth usage (the system is bound by both at all times and so chooses the worse case).

Bandwidth can be considered a commodity, and a precious one at that. The value of this commodity is directly related to the amount available. If there is plenty available (i.e. the network is idle), then it's relatively "inexpensive" to obtain and just about anybody is afforded the opportunity to consume it. Conversely, if the network is being heavily used, the remaining bandwidth is "expensive" and difficult to acquire. The unit of currency in this consumer's market is the skill level. The idea is to promote the best players currently requesting competitions.

Not all (100%) of the bandwidth is made available to the players; the servers, routers, etc. reserve a percentage of it for use as overhead. This percentage is termed the Overhead Reserved Percentage (ORP) and is tunable via the server suite configuration file. Once the ORP is reached, the BWM suspends all promotions until sufficient bandwidth becomes available.

Player skill level is contained in a variable, and the skill range is 0 to 255, where 0 is completely unskilled and 255 is the top level of skill. A threshold is established to separate the moderately skilled players from the highly skilled players. This threshold is termed the Skilled Player Threshold (SPT). The SPT is used to regulate a small amount of bandwidth reserved for highly skilled players. The bandwidth reserved is governed by the Skilled-player Reserved Percentage (SRP) and amounts to the bandwidth from the SRP to the ORP. Once a player's skill level exceeds the SPT, the player has full access to the reserved bandwidth. In this way we ensure that the best players are given the best chance at promotion. The SPT and SRP are tunable via the server suite configuration file. See FIG. 4.

There are two different metrics used to determine player promotion. The differences relate to the amount of bandwidth currently in use. If the bandwidth used is below a Free Access Percentage (FAP) or Free Promotion Threshold (FPT), then the player is granted access and promoted regardless of his or her skill level. This allows us to "prime the pump" (network) with players to encourage them to continue playing at a promoted level. It's simply more fun to play over the network, not to mention more profitable for the network operator. The FAP is tunable via the server suite configuration file. The value should be set low enough to ensure that we don't over commit the network with unskilled or average players.

Once the FAP has been reached the second promotion metric is used. Every time a player is granted access, that player's skill level is added to a list of skill levels of all currently promoted players. An average skill level (ASL) is then calculated and a line graph is created. One endpoint of the line is fixed at the FAP while the other varies from 0 to SPT along the fixed SRP X-value (See FIG. 5). The Y-value of the varying endpoint is the ASL just calculated. Armed with this information, the slope of the line is calculated by the following formula:

$y = mx + b$,
$m = (\Delta y / \Delta x)$
$\Delta y = ASL - 0$,
$ASL \in [0, SPT]$
$\Delta x = SRP - FAP$,
$SRP \in [0, 100], FAP \in [0, 100]$ $$\therefore m = ASL \div (SRP - FAP) \text{ and } b = -m(FAP)$$

Given the slope and current bandwidth usage, the BWM is able to compare the player's skill level with the current average skill level. Where x is the current in-use bandwidth percentage, y then becomes the Promotion Threshold (PT).

$$y = (ASL \div (SRP - FAP))x - (ASL \div (SRP - FAP))FAP$$

$$y = (ASL \div (SRP - FAP))(x - FAP)$$

Once y is calculated a simple comparison is all that's required to determine a player's access rights. If a player's skill level lands him above the PT line, the player is granted access for promotion.

USBWM—If the player lands below the PT line, the request is forwarded to the local Competition Server for coordination.

DSBWM—If the player skill lands below the line, the DSBWM simply drops the message. The player has insufficient skill for the current bandwidth usage. The game will continue to transmit the Competition Request at a rate of one per second until it either times out or bandwidth becomes available to the player due to a decreasing ASL.

Available bandwidth and average skill level are adjusted as players complete their competitions (or as garbage collection cleans up stale entries). The player's skill level value is decremented from a current list of skills in a time-delayed manner. This is accomplished by placing a skill entry for the player on the list of skill levels. After a small amount of time values in the list are reincorporated into the ASL value. This scheme keeps the ASL temporarily higher than it would be in order to better manage continuing players. Continuing players whose skill level increases after the competition will have a better chance to obtain bandwidth the next time around.

Figure 5:
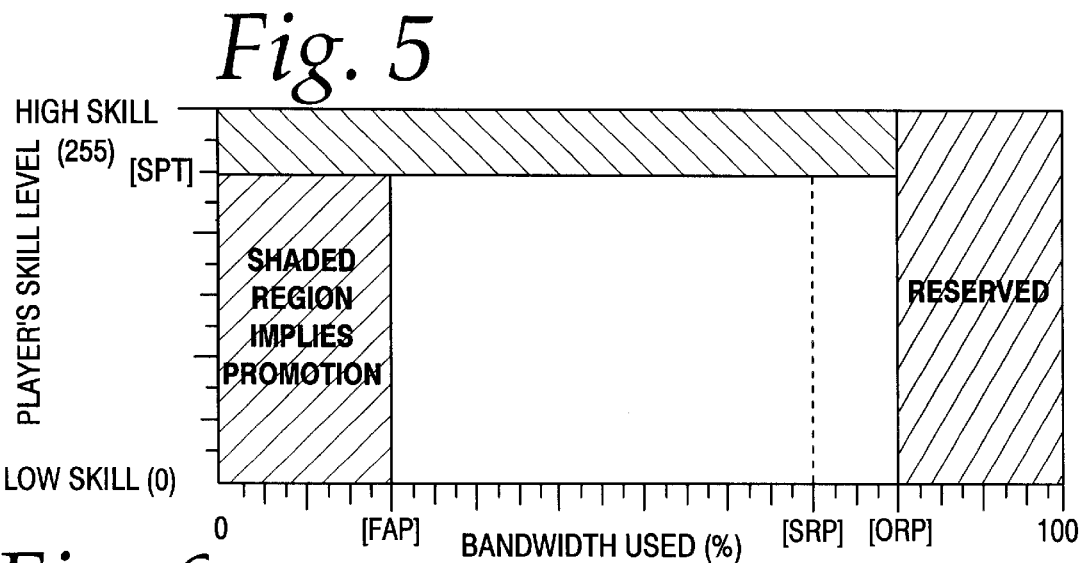
FIGS. 5 through 7 are diagrammatic illustrations of examples of bandwidth management in accordance with the invention.
Figure 6:
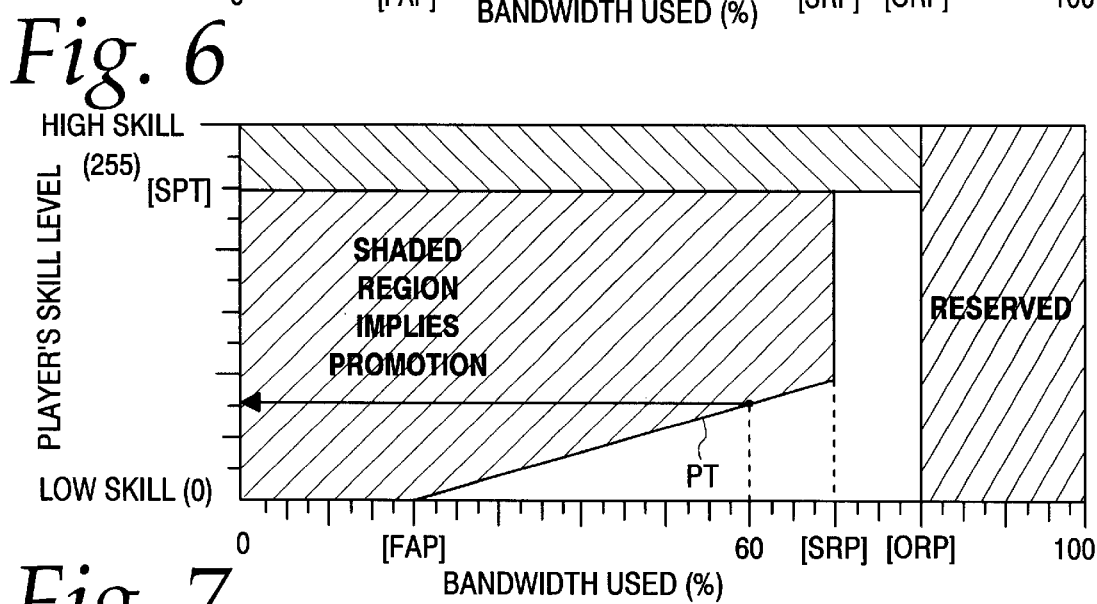
Figure 7:
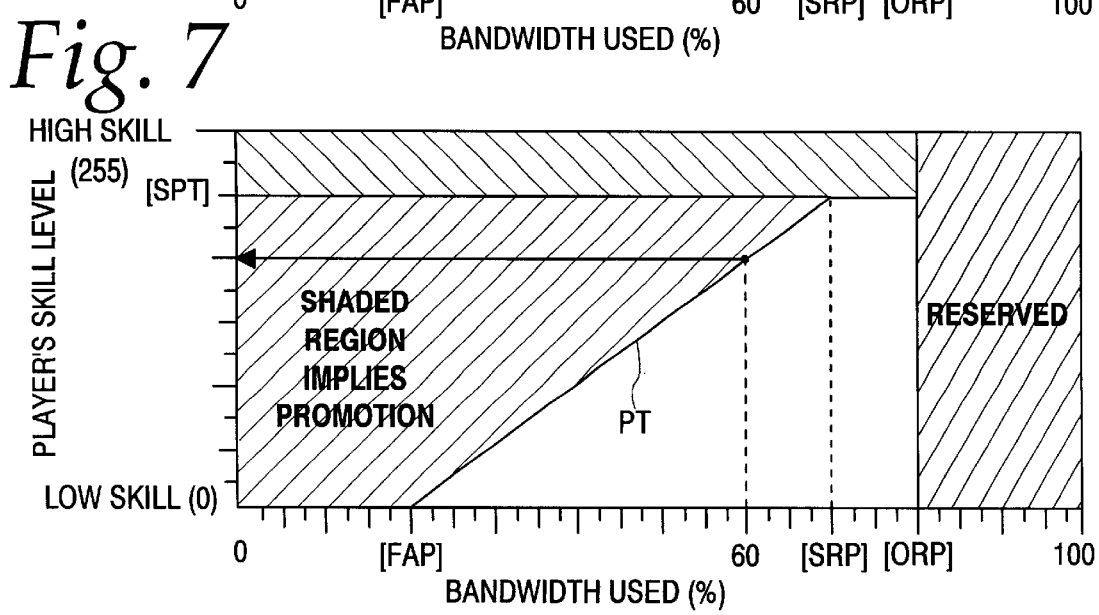

FIGS. 5 through 7 show three examples of the promotion heuristic. The shaded areas represent regions of promotion. FIG. 5 shows an example where less than FAP bandwidth has been consumed and therefore the BWM promotes all players. FIGS. 6 and 7 show an example where 60% of the bandwidth is in use and two examples of current average skill level (ASL). In FIG. 6 the ASL is fairly low and therefore a correspondingly lower skill level (the PT) is required for promotion. FIG. 7 represents a case where the ASL has reached the ceiling at SPT. Note that under the same bandwidth load of 60%, a much higher skill level (the PT) is required for promotion in FIG. 7.

There are five BWM tunables associated with the promotion heuristic. (See Table 5—"BWM Tunables" for further details regarding the tunables.)

[DSBWM]-or-[USBSM]
   skilled_player_thresh=170
   skilled_player_reserved=70
   free_access=20
   overhead_reserved=80
   bandwidth_avail=1200

For other game types, the system may incorporate a normalization mechanism to account for skill levels, since different game types may have different skill level patterns. Corrections, either static or dynamic, may be necessary. The bandwidth used, however, will remain the same, since all game units compete for the same bandwidth.

Message Type Analysis

In addition to the Common Server Management Messages, the BWM handles the following four message types: COMP_REQ, COMP_OVER, COMP_CONTINUE, COMP_OVER_ACK, and BWM_ADJUST.

TABLE 1

| COMP_REQ | [GAME UNIT -> SERVER] | |
| --- | --- | --- |
| WncpHdr_t | header; | // WaveNet Server Message Header |
| u_short | gtype; | // game type |
| u_short | gvers; | // game version |
| u_char | hop; | // message hop count |
| u_int | tid; | // transaction id |
| u_int | cid; | // competition id (0 if new) |
| u_char | skill; | // skill level of player |
| u_short | world; | // chosen world of play |

// promotion callback chain of IP addresses and port numbers

The BWM receives a COMP_REQ from each game every second until the CompServer closes the competition.

The first thing the BWM does with the request is increment the message hop count. The hop count implicitly indicates the message's distance from the game. The servers may leverage this information to deduce where they reside within the hierarchy.

The BWM then consults its internal state table to see if the player has already been granted access to the next level. If so the request is cleared for promotion. If the user has selected a world for play, the BWM appends its own IP address and port number to the message. By appending the addresses, we ensure a BWM_ADJUST callback happens at competition close time so that the bandwidth usage can be adjusted (see the Section "BWM_ADJUST" for more information).

USBWM—The COMP_REQ is then forwarded to the next level server suite (LinkServer).

DSBWM—The COMP_REQ is then forwarded to the local level USBWM for further promotion consideration.

If no state exists, the message is checked to see if it is a new or already-coordinated competition by looking at the value of the competition id, cid. If cid is 0, then the game is requesting a new competition. Otherwise the value of cid is that of a previously coordinated local competition and the message is routed to the local CompServer for processing.

For a new competition, the BWM next determines if the player should be considered for promotion. The sections "Network Bandwidth Management Concepts" and "Player Access Rights and Promotion Heuristic" give a detailed description of the promotion criteria. Assuming that the player qualifies for promotion, the BWM creates state for the player's request and adjusts the current average skill level and bandwidth usage. If the user has selected a world for play, the BWM then appends its own IP address and port number to the message.

USBWM—The COMP_REQ is then forwarded to the next level server suite (LinkServer).

DSBWM—The COMP_REQ is then forwarded to the local USBWM for further promotion consideration.

Otherwise, in a case where the promotion criteria have not been met, there is no next level in the hierarchy, the BWM is dormant, or the promotion logic has been disabled. No state is created for the player.

USBWM—The COMP_REQ is then forwarded to the local Competition Server for coordination.

DSBWM—The COMP_REQ message is dropped.

Figure 8A:
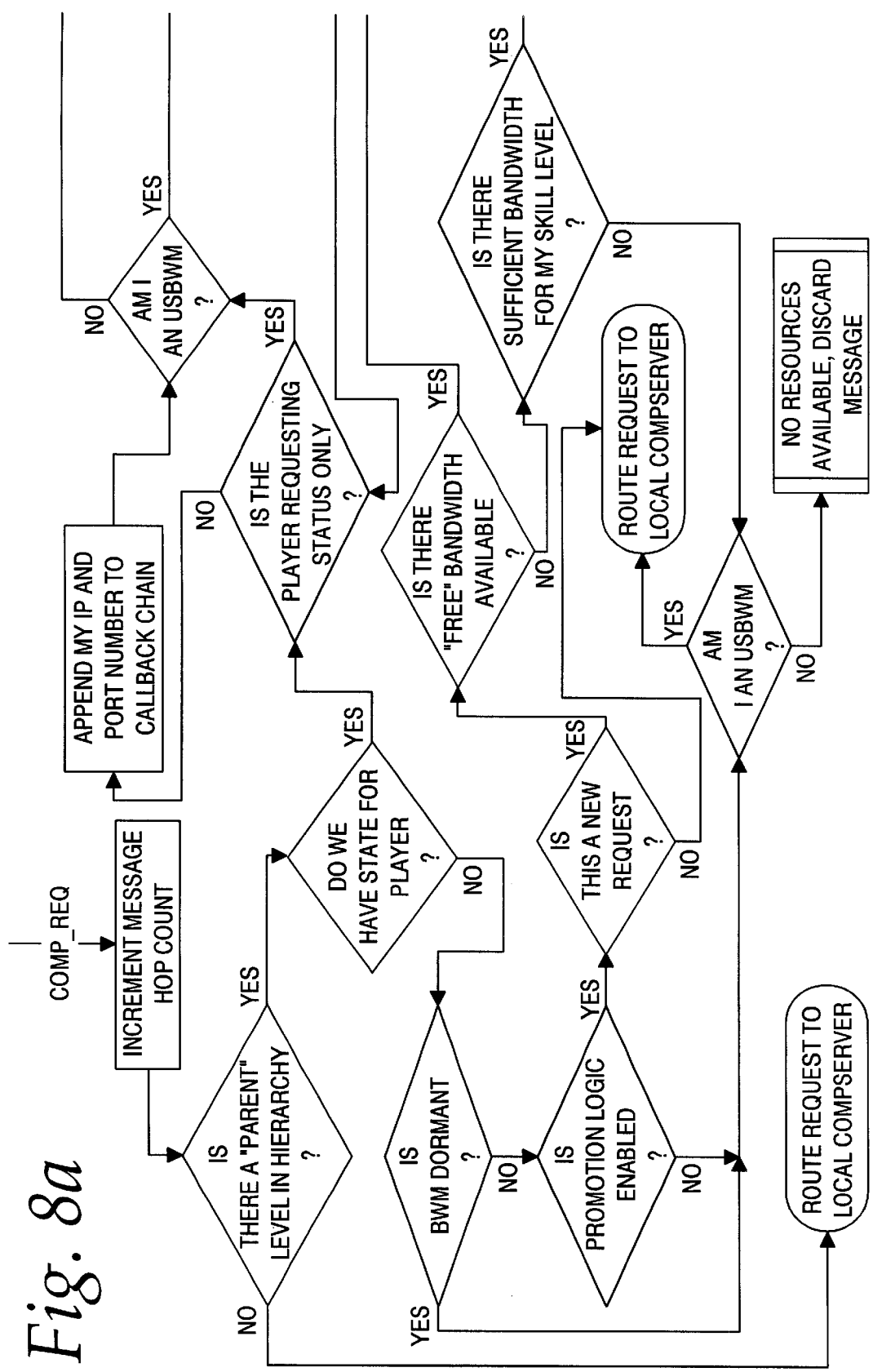
FIGS. 8 through 11 are flowcharts illustrating various aspects of bandwidth management in accordance with the invention.

See FIG. 8 for the COMP_REQ flow chart.

TABLE 2

| COMP_OVER, COMP_CONTINUE | | [GAME UNIT -> SERVER] |
|---|---|---|
| WncpHdr_t | header; | // WaveNet Server Message Header |
| u_short | gtype; | // game type |
| u_short | gvers; | // game version |
| u_char | hop; | // message hop count |
| u_int | tid; | // transaction id |
| u_int | cid; | // competition id |
| u_long | uid; | // the user id |
| u_int | tournid; | // the tournament id (0 of no tourney) |

The COMP_OVER message is generated by the game at the end of a network competition if the player chooses not to continue. If the player decides to continue, the game sends a COMP_CONTINUE message instead. The contents of both messages is identical, all that differs is the operation field in the header. Messages are sent by the game every second until the game ultimately receives an ACK. The ACK will be either a COMP_OVER_ACK or a COMP_CONTINUE_ACK depending on which operation was requested.

The first thing the BWM does with the request is increment the message hop count. The hop count implicitly indicates the message's distance from the game. The servers may leverage this information to deduce where they reside within the hierarchy.

The BWM then consults its internal state table to see if the player has already been granted access to the next level. If so, the BWM appends its own IP address and port number to the message. By appending the addresses, the BWM will be handed an ACK automatically on the return trip.

USBWM—The COMP_OVER/COMP_CONTINUE is then forwarded to the next level server suite (LinkServer).

DSBWM—The COMP_OVER/COMP_CONTINUE is then forwarded to local level USBWM.

Note that the COMP_OVER/COMP_CONTINUE message does not remove the state associated with the player's access rights. This is done upon reception of the ACK.

If there is no state for the player, then the competition was either local or its state has already been cleared out by a previous ACK. In either case, the message is passed onto the local CompServer for further processing.

Figure 9:
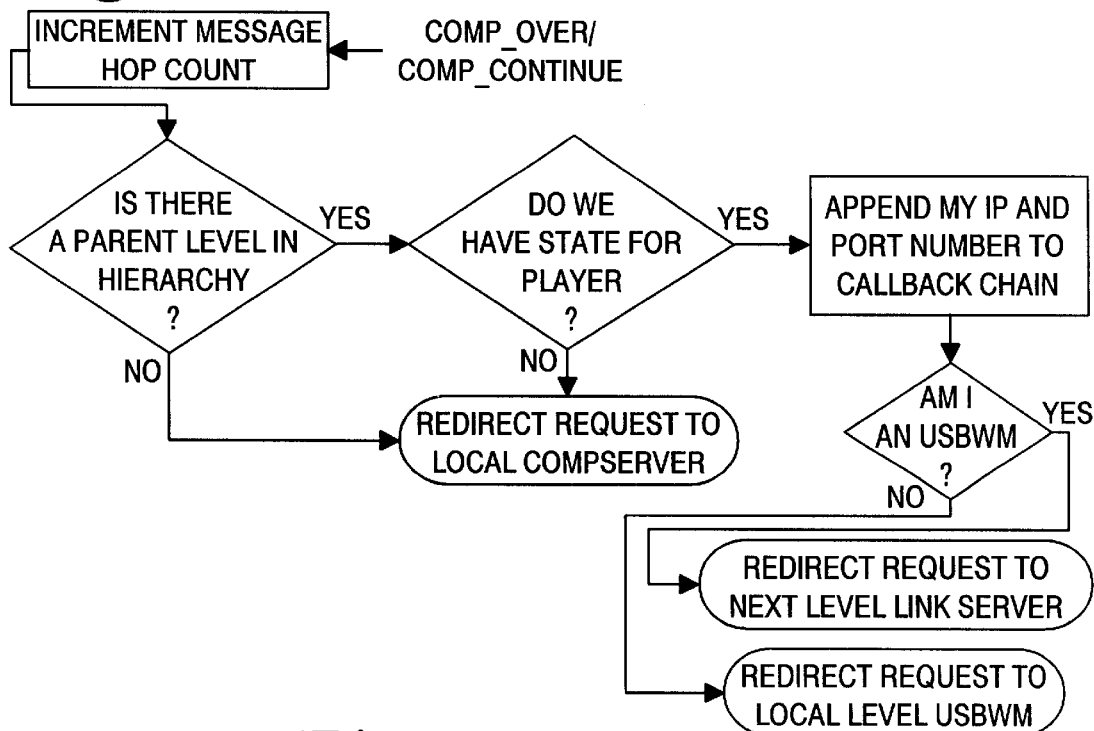

FIG. 9 is a flow chart for the COMP_OVER, COMP_CONTINUE message processing.

TABLE 3

| COMP_OVER_ACK, COMP_CONTINUE_ACK | | [SERVER -> GAME] |
|---|---|---|
| WncpHdr_t | header; | // WaveNet Server Message Header |
| u_int | tid; | // transaction id |
| u_int | cid; | // competition id |

The CompServer initially generates a COMP_OVER_ACK or COMP_CONTINUE_ACK in response to a COMP_OVER or COMP_CONTINUE, respectively. Recall that the BWM had previously appended its address and port onto the COMP_OVER message as it percolated up to the CompServer.

The purpose of the ACK message is two-fold. First, the BWM uses this message to initiate cleaning up any state created on behalf of the player. Second, the game treats this message as an indication that the servers have completed dealing with the player and the game is now free to make itself available for further WaveNet competitions.

When the BWM receives the ACK message, it checks to see if there is state for the competition. If there is, then all bandwidth allocated to the competition is cleaned up and the competition state entry is removed. This method makes bandwidth more readily available.

Next, a check is made to see if the player was previously promoted. If so, the game's state entry is removed. Bandwidth allocated to the game is also reclaimed if we have not already done so. Lastly, the ASL is adjusted.

The message is then passed on to the initiator. In this way, the ACK is cascaded back through all promoted levels automatically so that the state associated with creating a competition is properly torn down at each level. This design is very clean and very extensible.

If more than one player in the competition was promoted by the same BWM, then the BWM will be receiving multiple requests for reclamation for the same competition. Total reclamation for the competition is done once upon receipt of the first ACK. Subsequent messages are simply relayed back downstream.

Figure 10:
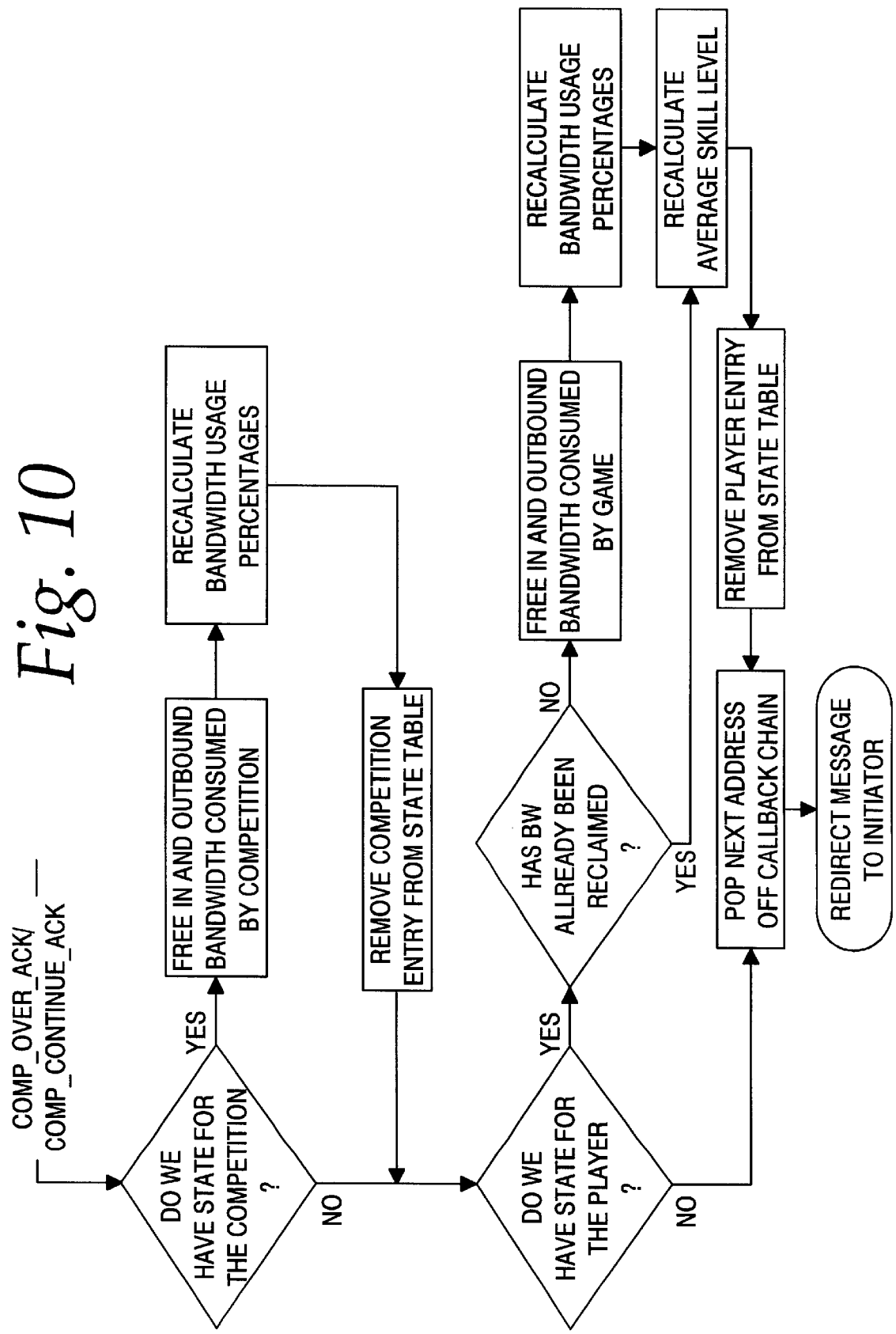

FIG. 10 is a flowchart for the COMP_OVER_ACK, COMP_CONTINUE_ACK message processing.

TABLE 4

| BWM_ADJUST | | [SERVER -> SERVER] |
|---|---|---|
| WncpHdr_t | header; | // WaveNet Server Message Header |
| u_int | tid; | // transaction id |

Figure 11:
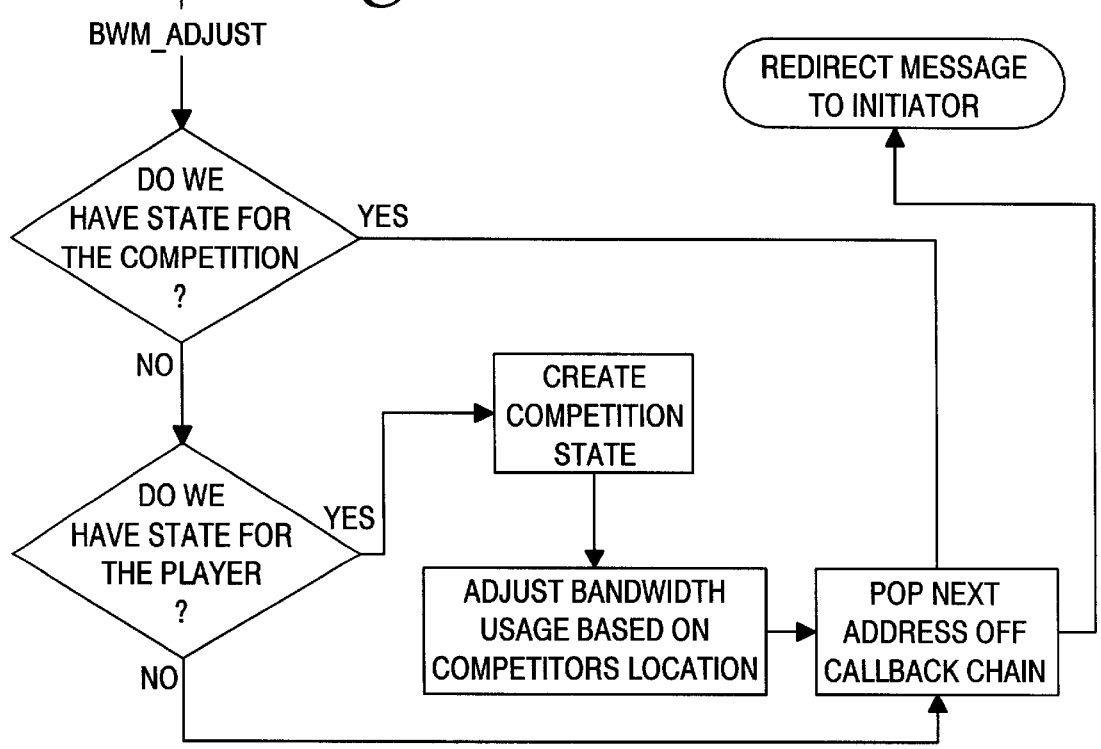

The CompServer generates the BWM_ADJUST message just after closing the competition. It is used to adjust the bandwidth that was initially reserved when state was created for the player as part of the promotion process. See the section "Network Bandwidth Management Concepts" for a description of the message and its action. FIG. 11 is a flow chart showing the BWM_ADJUST message processing.

Message Flow Analysis

Figure 12A:
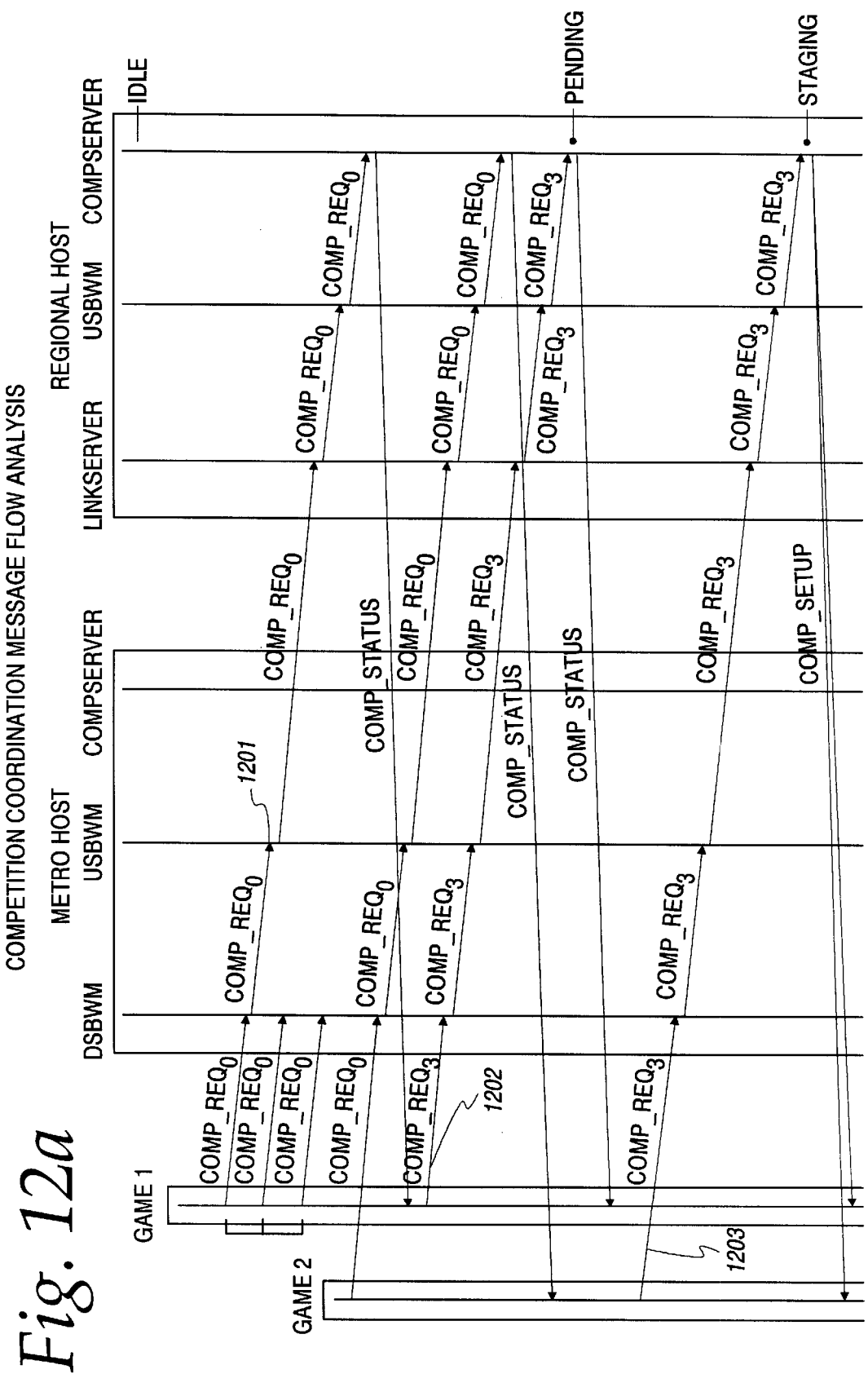
Figure 12B:
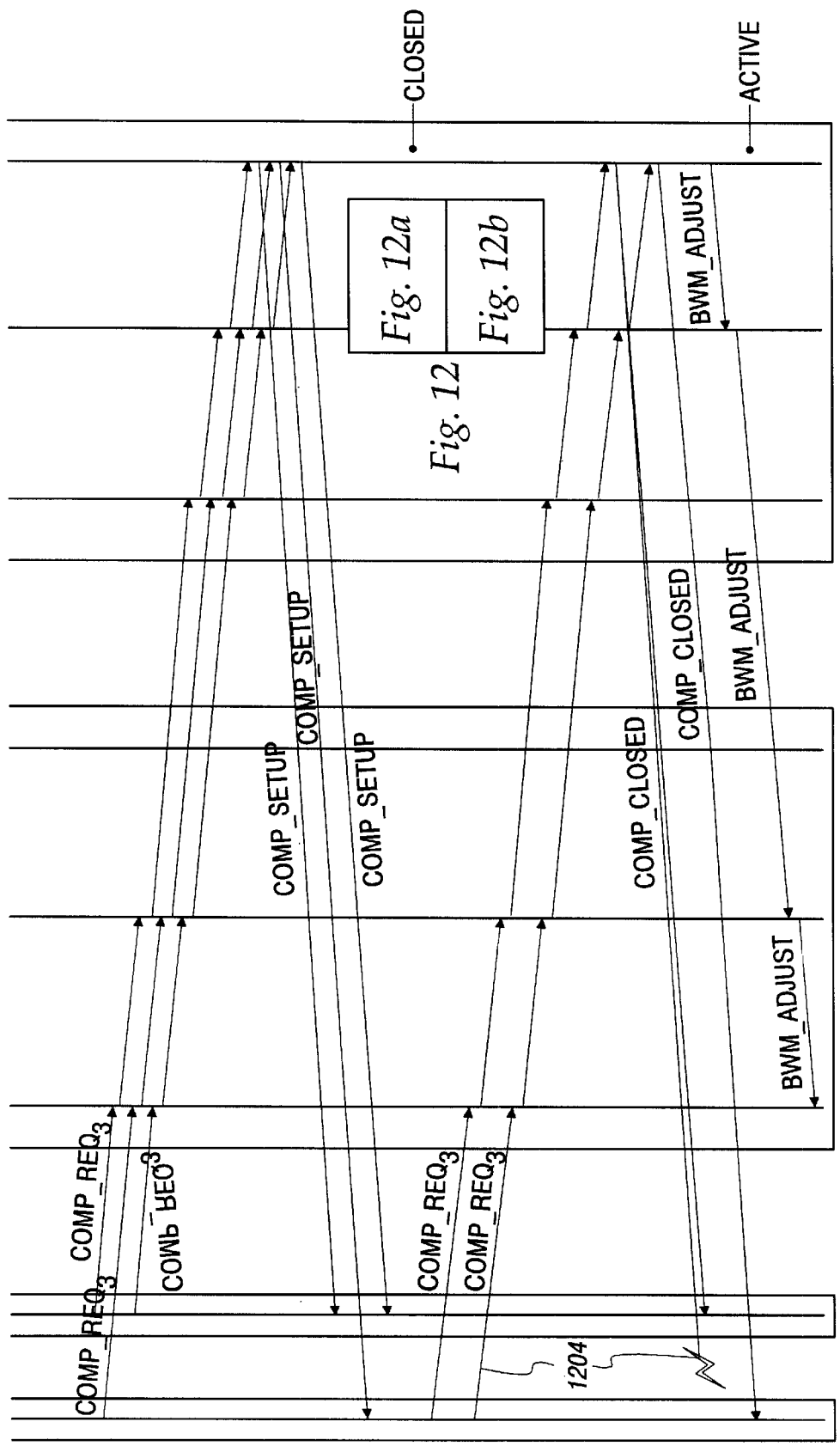

The three message flow diagrams or charts of FIGS. 12, 13 and 14 show a detailed analysis of the messages related to coordinating and cleaning up competitions. The first flow chart, FIG. 12, shows an example of two game units coordinating a competition. Included are all message types and competition states associated with setting up a competition. The states are more applicable to the CompServer. FIGS. 13 and 14 show the messages sent when a competition has completed. Included in this figure is an example of how the BWM and CompServer handle a previously lost message.

Referring to FIG. 12a, at the top right hand corner, competition requests are transmitted by a game unit every second. At reference numeral 1201, if the promotion criteria are met, state is created, bandwidth reserved, and the player promoted. The competition states are initially idle in the example of FIG. 12, until competition requests are received. A game unit will initially send a competition request without specifying a requested world to locate information regarding pending competitions. A COMP status message is returned until the player selects a world, as indicated at 1202. At this point, the competition state is pending. That is, upon receipt of a first COMP request with a selected world, a competition is created, and the state is changed to pending, however, a COMP status message is still returned.

At reference numeral 1203, a second player at another game unit joins the competition in the same world selected by the first player. The competition now enters the staging state wherein a stage-wait timer is initialized and a COMP setup message is returned to all games in the competition. At this state, each competition request is responded to with a COMP setup message. Once each BWM or the stage-wait timing expires, the state is changed to closed, a close-wait timer is initialized and a COMP_CLOSE message is returned to all games in the competition. At this point, each new competition request will be responded to with a COMP_CLOSE message. BWM_ADJUST will take place after closing the competition. The competition state is now active, after the close-wait timer expires. Reference numeral 1204 indicates a broken connection wherein the message is lost, and the game unit retransmits a competition request.

Referring to FIG. 13, at 1301, access rights are granted to a player and the player is passed to a USBWM. At 1302, the USBWM tracks promotions and passes a COMP_OVER message to the next level. At reference numeral 1303 the CompServer initiates the COMP_OVER acknowledgement once the data is stable. At 1304, competition teardowns cascade back through all promotion levels to ensure proper cleanup.

In FIG. 14, reference numeral 1401 indicates a broken connection wherein the COMP_OVER_ACK message is lost. The game unit will retransmit the COMP_OVER message. At 1402, another COMP_OVER message is received from an unrecognized or unknown competition. The COMP_OVER ACK reply is generated just the same.

BWM Tunables

TABLE 5

| Tunable name | Description | Data Type |
|---|---|---|
| host | Name of host executing BWM binary. | IP address |
| port | Port number on host executing USBWM binary. | u_short |
| in_bandwidth_avail | Input Bandwidth available from upstream. Units are kbits/sec. | u_int |
| out_bandwidth_avail | Output Bandwidth available to upstream. Units are kbits/sec. | u_int |
| skilled_player_thresh | Threshold separating good players from great players. | u_char |
| skilled_player_reserved | Bandwidth percentage above which is reserved for rockers. | u_char |
| free_access | Bandwidth percentage below which all players granted access. | u_char |
| overhead_reserved | Bandwidth percentage above which is reserved for overhead. | u_char |

Summary of BWM Salient Features

The network connections between the games, routers, servers, etc., shall be 1.5 Mbit/s T-1 lines.

Stateful. The BWM must track the players to whom it has previously granted access rights. This information is kept in a dynamic access rights table. The table contains the following elements: game IP address and port number, player's skill level, bandwidth consumed by the player's game, epoch (creation time) of the entry, the last access time of the entry, and a pointer to a competition entry.

USBWM's are symmetric with respect to the hierarchy level. This implies that the USBWM's perform the same functions no matter where they reside within the hierarchy.

DSBWM's are unique to the metro level. There is a separate DSBWM to manage each arcade that communicates with the metro server suite. To accomplish this, the DSBWM reads the appropriate file and activates a server for each unique domain (arcade). This is done at server invocation.

The DSBWM always routes to the local USBWM if the player is granted access, otherwise it drops the message due to insufficient available resources.

The same binary is used for both the upstream and downstream BWMs. The user must supply a "switch" at server invocation to indicate the direction. -d specifies a DSBWM, -u specifies an USBWM.

Both inbound and outbound bandwidth usage is monitored. When the BWM compares bandwidth usage, this implies a comparison to the greater of either the inbound or outbound value. The system is bound by both at all times and so chooses the worse case.

Skill level and available bandwidth are the components used to determine a player's access rights. If access if granted, the player is promoted to the next level in the hierarchy. The promotion heuristic is tunable so the thresholds may be adjusted without the need to recompile the code. The heuristic is dynamic in nature and varies based on the set of players currently consuming the bandwidth.

The USBWM, as part of its promotion logic, is one of the few servers allowed to route messages to other levels in the hierarchy. This is accomplished very simply. Promotion results in the competition request being passed to the parent server suite (LinkServer) at the next level in the hierarchy (provided there is a next level). This interface allows the system to easily scale to any depth.

The BWM shall remain dormant at start-up for a fixed amount of time (with a default, e.g., 5 minutes). This is to allow the network to settle into a known state before access rights are granted and bandwidth is consumed.

Promotion logic may be disabled to effectively turn off player promotions. This is accomplished via a command sent by the WaveNet server tool. The dormant time is adjustable via the tool.

The USBWM requires the IP address and port number of the parent LinkServer. These values are derived from the local server suite configuration file. The following new section and tokens are created:

[Parent]
    host=<parent LinkServer hostname or IP address>
    port=<parent LinkServer port number>

There is a separate configuration file section for each BWM. This allows better tuning granularity. The USBWM's section is called [USBWM], the DSBWM's section is called [DSBWM]. The configuration file for levels above the metro level do not have a DSBWM entry.

A periodic "garbage collection service" is provided to clean up stale server state and any reserved bandwidth entries. Stale entries may arise due to network/server failures. A "timer" is checked at the end of every message and if it is "popped" then the "garbage collection service" is invoked. The timer is set to the value BWM_COLLECT_GARBAGE seconds. Entries are considered old after BWM_AGE_OLD seconds. These values are not tunable in the embodiment described herein.

Garbage collection may also be triggered by sending a SERVER_COLLECT_GARB message to the BWM.

A periodic consistency check is performed to verify the average skill level (ASL) and bandwidth usage percentage. This is done by comparing all players and competition states with the dynamic values used to maintain the ASL and bandwidth usage. A timer similar in concept to the BWM_COLLECT_GARBAGE timer is kept. The value is not tunable in the embodiment described herein.

IV. Architecture

WaveNet Server Commonality

All servers provide support for a set of Common Server Management Messages (CSMMs). The BWM conforms to this requirement. The CSMM messages control the BWM's internal functionality. The Operation Types are as follows:

1. Server verbosity level (SERVER_VERBOSE) [LOG_CRIT (0)—LOG_DEBUG (7)]
2. Allow (SERVER_EXIT_YES) or disallow (SERVER_EXIT_NO) the BWM to exit on error
3. Produce (or not) a core file on exit (SERVER_EXIT_YES/SERVER_ERR_CORE)
4. Reread server configuration file (SERVER_HUP), reinitialize BWM state
5. Receive/Ack a ping message (SERVER_PING)
6. Force the BWM to die and produce a core file (SERVER_FORCE_CORE)
7. BWM specific—force garbage collection (SERVER_COLLECT_GARB)

WaveNet Control Protocol Header (WNCP)

All messages passed between the game unit(s), NSS, and Servers are encapsulated within a packet prefixed by a common header. The message header and data is packed (byte aligned) and passed in network byte order. The WaveNet Server Message Header has the following structure:

```
typedef struct WncpHdr {
    u_short Size;        // overall size of the message
    u_char Version;      // the version of the message
    u_char Channel;      // the communication channel
    u_char Spare[4];     // extra space just in case . . .
    u_char Service;      // desired service
    u_char Operation;    // desired operation
    u_long SourceIP;     // message source IP address
    u_short SourcePort;  // message source port number
} WncpHdr_t;
```

All incoming game-to-server messages include the game type and game version immediately following the WNCP Header. Many of the servers need to discern between game types and therefore this requirement should be adhered to. All game unit-to-server messages begin with the format

```
WncpHdr_t       header;
u_char          gtype;
u_char          gvers;
    .........
```

While the invention may be susceptible to various modifications and alternative forms, specific embodiments have been shown and described herein above by way of example. It should be understood, however, that it is not intended to limit the invention to the particular forms disclosed. On the contrary, the intention is to cover all modifications, equivalents and alternatives falling within the spirit and scope of the invention as defined by the dependent claims.

What is claimed is:

1. A system for networking electronic game units, comprising:
    an arcade router coupled with one or more game units at each of a plurality of locations and coupled to a communications resource for supporting bi-directional exchange of information with said one or more game units;
    a first router coupled with a first group of said communications resources for supporting bi-directional exchange of information with a corresponding first group of said one or more game units;
    a first server coupled with said first router for controlling said bi-directional exchange of information so as to support interactive play by a plurality of game units at different ones of said plurality of locations; and
    a state synchronizing system for synchronizing the exchange of state information among game units which are engaged in interactive play in such a manner that each of said game units operates on substantially the same sequence of incoming information.

2. The system of claim 1 having a plurality of first routers and further including at least one additional router coupled by one or more communications resources to two or more of said first routers, and at least one additional server coupled with said additional router for controlling bi-directional exchange of information between said two or more first routers for supporting interactive play for game units coupled via communications resources with said two or more first routers.

3. The system of claim 2 wherein each of said servers includes a bandwidth manager for controlling access of a game unit to the network based on available bandwidth and on a player skill level associated with the game unit.

4. The system of claim 3 wherein said bandwidth manager includes:

means for determining available bandwidth;

means for determining a player skill level associated with each game unit requesting access to the network;

means for determining the average skill level (ASL) of all players requesting access to the network;

means for establishing a promotion threshold (PT) based on said average skill level and said available bandwidth; and means for granting player access to the network if the player's skill level exceeds said promotion threshold.

5. The system of claim 4 wherein said bandwidth manager further includes means for assigning a predetermined percentage of said bandwidth as a free access percentage (FAP) wherein access is granted without regard to player skill for so long as said free access percentage of said bandwidth is available.

6. The system of claim 5 wherein said bandwidth manager further includes means for establishing a skilled player reserve percentage (SRP) of said bandwidth and a skilled player threshold skill level, above which a game unit will be granted access to said skilled player reserve percentage of said bandwidth.

7. The system of claim 6 wherein when said free access percentage of said bandwidth is in use, network access is granted when player skill level exceeds a promotion threshold determined in accordance with the following:

$$y=(ASL\div(SRP-FAP))x-(ASL\div(SRP-FAP))FAP$$

$$y=(ASL\div(SRP-FAP))(x-FAP)$$

wherein the x axis represents percentage of bandwidth currently in use, the y axis represents player skill level, such that the value of y comprises the promotion threshold; and wherein ASL is the average skill level, SRP is the skilled player reserve percentage and FAP is the free access percentage.

8. The system of claim 3 wherein said bandwidth manager further includes means for establishing an overhead reserve percentage of said bandwidth unavailable for player access.

9. The system of claim 2 wherein said at least one additional router and server comprise one or more regional routers and servers for supporting interactive play for game units coupled via communications resources with two or more first routers, at least one super-regional router and server for supporting interactive play for game units which are coupled via communications resources and first routers with two or more of said regional routers and servers and a national router and server for supporting interactive play for game units coupled via communications resources, first routers and regional routers to two or more of said super-regional routers.

10. The system of claim 1 wherein said first server further includes a bandwidth manager for controlling access of each game unit to said network based on available bandwidth and on a player skill level associated with each game unit.

11. The system of claim 10 wherein said bandwidth manager includes:

means for determining available bandwidth;

means for determining a player skill level associated with each game unit requesting access to the network;

means for determining the average skill level (ASL) of all players requesting access to the network;

means for establishing a promotion threshold (PT) based on said average skill level and said available bandwidth; and means for granting player access to the network if the player's skill level exceeds said promotion threshold.

12. The system of claim 1 wherein said state synchronizing means further includes means for determining the number of game units participating in a multi-system game, means for transmitting input data from each of said game units when in each of a plurality of states to each other game unit, and means for preventing each game unit from transitioning to a next state until the input data from every other game unit in said multi-system game in the prior state have been received, such that all game units in said multi-system game operate on the same set of said input data in each state prior to transitioning to the next state.

13. A bandwidth manager for a network for linking a plurality of game units for interactive play, said bandwidth manager controlling access of each game unit to said network based on available bandwidth and on a player skill level associated with each game unit, said bandwith manager comprising:

means for determining available bandwidth;

means for determining a player skill level associated with each game unit requesting access to the network;

means for determining the average skill level (ASL) of all players requesting access to the network;

means for establishing a promotion threshold (PT) based on said average skill level and said available bandwidth; and means for granting player access to the network if the player's skill level exceeds said promotion threshold.

14. The bandwidth manager of claim 13 and further including means for assigning a predetermined percentage of said bandwidth as a free access percentage (FAP) wherein access is granted without regard to player skill for so long as said free access percentage of said bandwidth is available.

15. The bandwidth manager of claim 14 and further including means for establishing a skilled player reserve percentage (SRP) of said bandwidth and a skilled player threshold skill level, above which a game unit will be granted access to said skilled player reserve percentage of said bandwidth.

16. The bandwidth manager of claim 15 wherein when said free access percentage of said bandwidth is in use, network access is granted when player skill level exceeds a promotion threshold determined in accordance with the following:

$$y=(ASL\div(SRP-FAP))x-(ASL\div(SRP-FAP))FAP$$

$$y=(ASL\div(SRP-FAP))(x-FAP)$$

wherein the x axis represents percentage of bandwidth currently in use, the y axis represents player skill level, such that the value of y comprises the promotion threshold; and wherein ASL is the average skill level, SRP is the skilled player reserve percentage and FAP is the free access percentage.

17. A method for managing bandwidth in a network for linking a plurality of game units for active play, said method controlling access of each game unit to communications resources of said network based on available bandwidth and on a player skill level associated with each game unit, said method comprising the steps of:

determining available bandwidth on each communication resource;

determining a player skill level associated with each game unit requesting access to the network;

determining the average skill level (ASL) of all players requesting access to the network;

establishing a promotion threshold (PT) based on said average skill level and said available bandwidth; and granting player access to the network if the player's skill level exceeds said promotion threshold.

18. The method of claim 17 and further including the step of assigning a predetermined percentage of said bandwidth as a free access percentage (FAP) wherein access is granted without regard to player skill for so long as said free access percentage of said bandwidth is available.

19. The method of claim 17 and further including the step of establishing a skilled player reserve percentage (SRP) of said bandwidth and a skilled player threshold skill level, above which a game unit will be granted access to said skilled player reserve percentage of said bandwidth.

20. The method of claim 17 wherein when said free access percentage of said bandwidth is in use, network access is granted when player skill level exceeds a promotion threshold determined in accordance with the following:

$$y=(ASL \div (SRP-FAP))x - (ASL \div (SRP-FAP))FAP$$
$$y=(ASL \div (SRP-FAP))(x-FAP)$$

wherein the x axis represents percentage of bandwidth currently in use, the y axis represents player skill level, such that the value of y comprises the promotion threshold; and wherein ASL is the average skill level, SRP is the skilled player reserve percentage and FAP is the free access percentage.

21. A bandwidth manager for a network for linking a plurality of game units for interactive play, said bandwidth manager controlling access of each game unit to said network based on available bandwidth and on a player skill level associated with each game unit, said bandwith manager comprising:

means for determining available bandwidth at each level of the network;

means for determining a player skill level associated with each game unit requesting access to the network;

means for determining the average skill level (ASL) of all players requesting access to the network;

means for establishing a promotion threshold (PT) for each level of the network based on said average skill level and said available bandwidth; and means for granting player access to a given level of the network if the player's skill level exceeds said promotion threshold for that level of the network.

22. The bandwidth manager of claim 21, wherein the available bandwidth is determined by subtracting an overhead bandwidth from a total bandwidth of the network.

23. The bandwidth manager of claim 21, further comprising means for determining whether the promotion threshold is above a free promotion threshold.

24. The bandwidth manager of claim 23, further comprising means for promoting all game units to a skill above the promotion threshold if the promotion threshold is below the free promotion threshold.

25. The bandwidth manager of claim 21, further comprising means for referring a player to a local server if the player has a skill level below the promotion level.

26. A method for managing bandwidth in a network for linking a plurality of game units for active play, said method controlling access of each game unit to communications resources of said network based on available bandwidth and on a player skill level associated with each game unit, said method comprising the steps of:

determining available bandwidth on each communications resource;

determining a player skill level associated with each game unit requesting access to the network;

determining the average skill level (ASL) of all players requesting access to the network;

establishing a promotion threshold (PT) for each level of the network based on said average skill level and said available bandwidth; and granting player access to a given level of the network if the player's skill level exceeds said promotion threshold for that level of the network.

27. The method of claim 26, wherein determining the available bandwidth on each communications resource comprises subtracting an overhead bandwidth from a total bandwidth.

28. The method of claim 26, further comprising determining whether the promotion threshold is greater than a free promotion threshold.

29. The method of claim 28, further comprising promoting the skill level of all players if the promotion threshold is less than the free promotion threshold.

30. The method of claim 26, further comprising referring a player to a local server if the player has a skill level below the promotion threshold.

31. A state synchronizing system for synchronizing the exchange of state information among a plurality of game units which transition through a plurality of states in a course of a game and which are engaged in interactive play in such a manner that each of said game units operates on substantially the same sequence of incoming information, the state synchronizing system further including means for determining a number of game units participating in a multi-system game, means for transmitting input data from each of said game units when in each state to each of the other of the plurality of game units, and means for preventing each game unit from transitioning to a next state until the input data from every other game unit in said multi-system game in a prior state have been received, such that all game units in said multi-system game operate on a same set of said input data in each state prior to transitioning to the next state.

32. The state synchronizing system of claim 31, further comprising a buffer connected to the game units for storing the inputs from said game units until said buffer has received an input for all of said game units.

33. The state synchronizing system of claim 31, wherein the means for transmitting input data is a T-1 line.

34. The state synchronizing system of claim 31, wherein the means for transmitting input data is a fiber optic line.

35. The state synchronizing system of claim 31, wherein the means for preventing transitioning waits for a predetermined time to receive input from all of the game units.

36. The state synchronizing system of claim 35, wherein the predetermined time is 1/60 of a second.

37. A state synchronizing method for synchronizing the exchange of state information among game units which transition through a plurality of states in the course of a game which are engaged in interactive play in such a manner that each of said game units operates on substantially a same sequence of incoming information, said state synchronizing method further including the steps of:

determining a number of game units participating in a multi-system game;

transmitting input data from each of said game units when in each state to each other game unit; and preventing each of said game units from transitioning to a next state until input data from every other game unit in said multi-system game in a prior state have been received, such that all game units in said multi-system game operate on a same set of said input data in each state prior to transitioning to a next state.

38. The method of claim 37 further comprising transmitting inactivity for an inactive game unit in said multi-system game when said inactive game unit does not provide any input for a predetermined time.

39. The method of claim 38 wherein the predetermined time is 1/60 of a second.

40. The method of claim 37, wherein the transmitting is done via a T-1 line.

41. The method of claim 37, wherein the transmitting is done via a fiber optic line.

* * * * *